United States Patent [19]

Kim et al.

[11] 4,379,126
[45] Apr. 5, 1983

[54] PROCESS FOR RECOVERING TUNGSTEN VALUES FROM ALKALI SOLUTIONS

[75] Inventors: Tai K. Kim; Joseph E. Ritsko; Martin B. MacInnis; Martin C. Vogt, all of Towanda, Pa.

[73] Assignee: GTE Products Corporation, Stamford, Conn.

[21] Appl. No.: 292,376

[22] Filed: Aug. 13, 1981

[51] Int. Cl.³ ............................................. C01G 41/00
[52] U.S. Cl. ................................ 423/54; 75/101 BE; 423/593; 423/DIG. 14; 423/658.5
[58] Field of Search .................... 423/54; 75/101 BE; 210/670

[56] References Cited

U.S. PATENT DOCUMENTS 3,158,438 11/1964 Kurtak .................................... 423/54
3,357,821 12/1967 Henrickson .................... 75/101 BE
4,175,109 11/1979 Kim ....................................... 423/54

FOREIGN PATENT DOCUMENTS 1240524 7/1971 United Kingdom .................. 423/54

OTHER PUBLICATIONS

Ritcey et al., "Proceedings of the International Solvent Extraction Conference", Lyon, 1974, Soo. of Chemical Industry, London, 1974, pp. 943-968.

Primary Examiner—Herbert T. Carter
Attorney, Agent, or Firm—Robert E. Walter

[57] ABSTRACT

In a continuous process for producing ammonium tungstate from aqueous alkali metal tungstate solution according to an extraction process, the loaded organic extractant is cleaned after stripping by contacting with activated carbon for improving phase separation and decreasing the concentration of alkali metal.

1 Claim, 2 Drawing Figures

PROCESS FOR RECOVERING TUNGSTEN VALUES FROM ALKALI SOLUTIONS

BACKGROUND OF INVENTION

The present invention relates to the recovery of tungsten values from aqueous alkali metal tungstate solutions by liquid-liquid solvent-extraction process. More particularly, the invention relates to the extraction of tungsten values by an organic mixture and subsequent recovery of an ammonium tungstate solution by stripping.

Prior art processes relating to recovery of tungsten include U.S. Pat. Nos. 3,158,438 to Kurtak; 3,256,058 to Burwell; and 3,293,004 to Musgrove et al; South african patent 684,892 and British patent 1,240,524. U.S. Pat. No. 4,175,109 to Kim relates to a tungsten extraction process.

It is an object of the present invention to provide an improved process for recovery of tungsten values from aqueous alkali metal tungstate solutions.

It is an object of the present invention to improve phase separation during extraction and decrease the concentration of alkali metal in the product ammonium tungstate.

Other and further objects will become apparent from reading the following description.

SUMMARY

In accordance with the present invention, there is provided a process for producing ammonium tungstate from an aqueous alkali metal tungstate solution comprising the steps of: (a) extracting tungsten values into an organic extractant by contacting said aqueous alkali metal tungstate solution with said organic extractant for a sufficient period of time to form a loaded organic extractant containing tungsten values and an aqueous solution, said organic extractant comprises a high-molecular weight alkyl amine and an organic solvent, (b) separating said loaded organic extractant from said aqueous solution, (c) stripping said loaded organic extractant from step (b) by contacting with an aqueous ammonia solution to form an aqueous ammonium tungstate solution and a stripped organic extractant, (d) separating said stripped organic extractant from said aqueous ammonium tungstate solution, (e) removing impurities from said stripped organic extractant from step (b) by contacting said stripped organic extractant with activated carbon, (f) and feeding said stripped organic extractant from step (e) to step (a) for use as said organic extractant.

DRAWINGS

FIGS. 1-A and 1-B are schematic drawings of an extraction process.

DETAILED DESCRIPTION

The organic extractant utilized in the process of the present invention comprises an active extractant consisting of a high-molecular weight alkyl amine and a solvent consisting of a liquid hydrocarbon.

The amine extractant is preferably either secondary or tertiary containing aliphatic hydrocarbon groups from 8 to 22 carbon atoms. The most preferred amine extractant is a tertiary amine, tricaprylamine (e.g., Alamine 336 produced by General Mills, Inc. or Adogen 364 produced by Archer Daniels-Midland, Inc.). The amine extractant should be only sparingly soluble in water and be capable of forming tungstate amine complexes which are soluble in the organic phase. Typical suitable amines are triamylamine, tri-isooctylamine, tri-isodecylamine, didecylamine, and di(tridecyl)amine.

The organic extractant typically includes a phase conditioner. Phosphate esters are typical phase conditioners or modifiers and serve to minimize or prevent emulsion and third phase formation. Tri-(hydrocarbyl) phosphates wherein the ether radical is a hydrocarbon radical are preferred. The trialkyl phosphates are preferable with the tributyl and triamyl phosphates being most preferred. Other typical phase conditioners include high molecular weight alcohols such as isododecanol.

The solvent is preferably a water insoluble liquid hydrocarbon predominantly aliphatic in nature prepared from crude oil by fractionation. By water insoluble it is meant that less than 5 grams of the hydrocarbon dissolves in 1000 cc. of water at 25° C. Preferably the solvent is aliphatic hydrocarbon or kerosene type liquid hydrocarbon. The kerosene preferably has a minimum flash point of 120° F. and more preferably greater than about 135° F. The most preferred solvent is Kermac 470W which is an aliphatic kerosene type petroleum distallate. Kermac 470W which is commercially available from Kerr-McGee Co. has a higher flash point and narrower boiling range as compared to kerosene. The TCC flash point is 175° F. with a specific gravity 60/60° F. of 0.8109.

The preferred ratio of amine extractant to solubilizer to solvent is within the volume range of from about 1:0.5:8.5 to about 2:1.2:6.8 and preferably within the volume range of 1:0.5:8.5 to about 1:2:7. The most preferred volume ratio is 1:1.2:7.8.

Figure 1A:
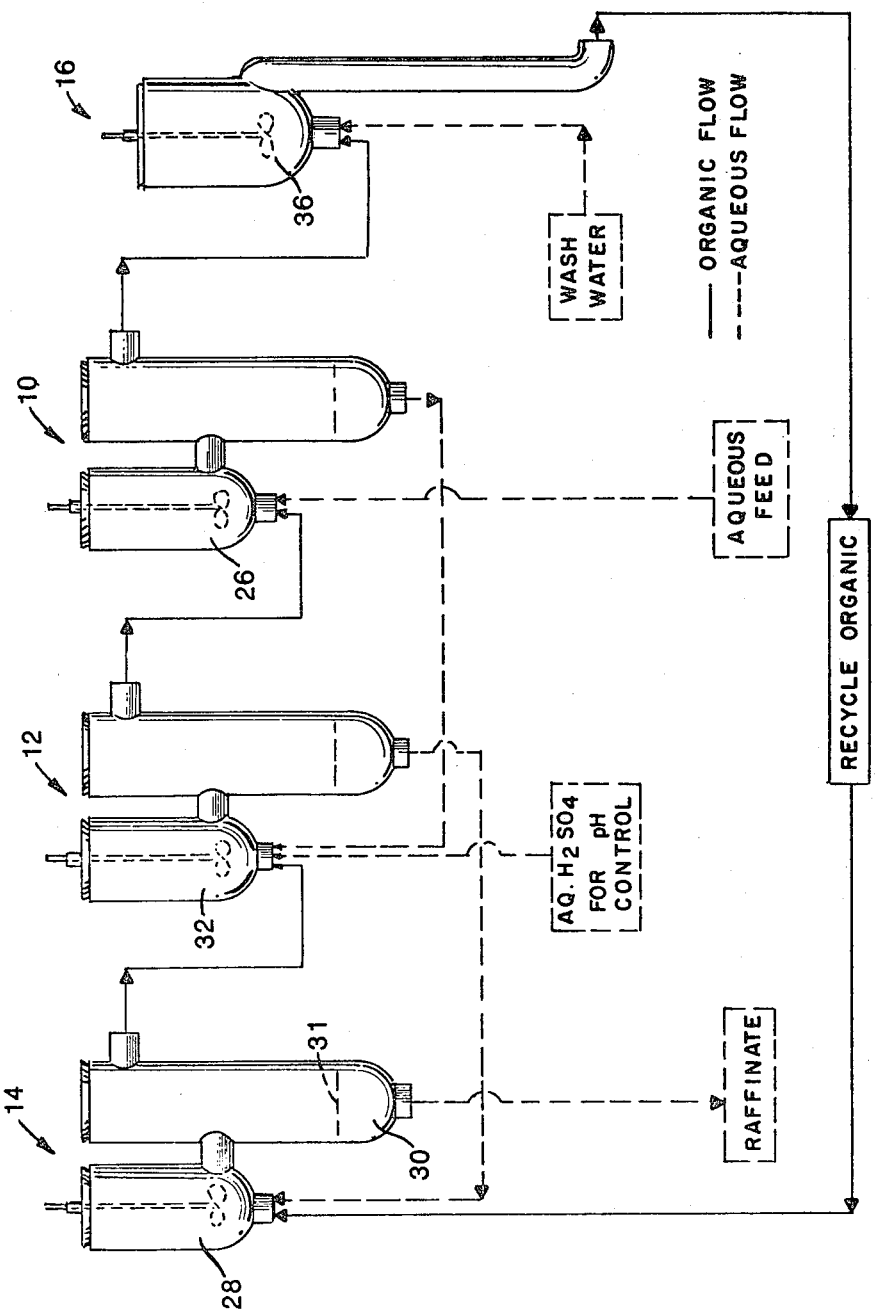
Figure 1B:
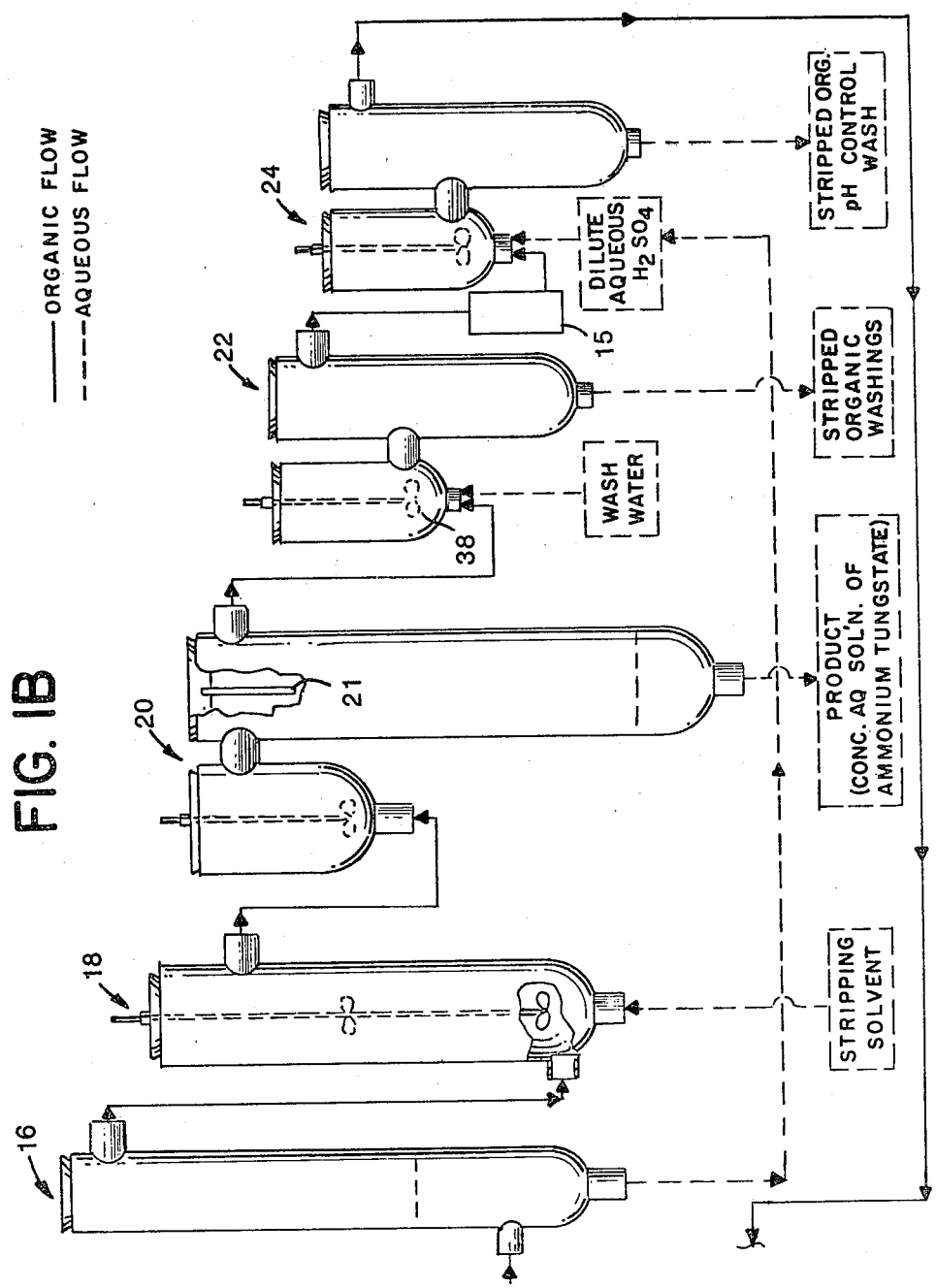

In connection with the drawings, reference is made to FIGS. 1-A and 1-B which illustrates schematically a series of mixer-settler units that can be subdivided into an extraction circuit, a cleaning circuit and a stripping circuit. The extraction circuit comprises three units or stages: a first stage 10, a second stage 12, and a third stage 14. The cleaning circuit which washes the loaded organic comprises a scrub stage 16. A stripping circuit comprises a stripping column-contactor 18, followed by a mixer-settler 20. Another cleaning circuit which is associated with the unloaded or stripped organic includes a wash stage 22, an absorption stage and an organic regeneration stage 24.

In the extraction circuit aqueous sodium tungstate solution, adjusted to a pH of 2.0 with sulfuric acid and having a concentration of about 119 grams of $WO_3$/liter, is fed to mixing compartment 26 of the first extraction stage 10 and then to mixing compartment 32 of second stage 12 at a rate of about 10 ml./min. At the same time barren or unloaded organic extractant is fed to the mixing compartment 28 of the third extraction stage 14. Organic feed solution flows counter-currently to the aqueous feed flow, i.e., from stage 14 to stage 10, while progressively extracting and loading tungstate at each stage until it reaches a maximum (or other desirable loading) at stage 10.

The aqueous feed solution while traveling counter-currently to the organic extractant from stages 10, 12, and 14, as is illustrated in FIG. 1-A, becomes progressively depleted of tungsten values. Substantially fully depleted tungstate solution or raffinate is discharged from the settling section 30 of stage 14, and typically has a pH of 1.0, a specific gravity of 1.063 and contains about 0.01 grams of $WO_3$ per liter. The approximate point where separation between the aqueous and organic phases occurs is shown by the broken line 31 of the settling section 30 of stage 14. Similar broken lines indicate the approximate points where phase separation occurs in settling sections of other units or stages in the system. Loaded organic extractant exiting the settling section 34 of stage 10 is fed to a cleaning circuit 16 comprising a mixing section 36 shown in FIG. 1-A and settling section shown in FIG. 1-B where the loaded organic extractant is washed or scrubbed. Preferably the wash water is deionized water which is employed to reduce the amount of soluble impurities in the loaded extractant.

In the organic regeneration stage 24, the stripped and washed organic extractant is regenerated for recycling to stage 14 of the extraction circuit by contact with a dilute aqueous solution of sulfuric acid. During regeneration, the amine component of the organic extractant is converted to the sulfate or bisulfate form. The extraction involves a mechanism where the tungstate ion is exchanged for the sulfate or bisulfate ion for the tungstate ion to extract tungsten values.

In the stripping circuit, loaded organic solution flows to a point near the bottom of the column contractor-stripper 18 wherein it is contacted, under controlled agitation, with stripping solution being fed to the stripper at a rate of 6 ml./min., and passes upwardly through the column. The stripping solution consists of a relatively dilute ammonium tungstate solution containing 101.5 grams of $WO_3$ per liter which has been fortified by gassing with ammonia gas to a pH of 11.0. The pH values to which reference is made herein are made with a pH meter, specifically Beckman zeromatic pH meter, Beckman Instruments Inc., Fullerton, (California).

The stripped organic solvent from the mixer-settler unit 20, which is provided with a baffle 21 in the upper part of the settling section where indicated in FIG. 1-B, flows to a wash stage 22 wherein a scrubbed free of entrained ammonium tungstate deionized water (scrubbed water) is fed to the mixing compartment 38 of the wash stage 22 at a rate of 3 ml./min. The washings from the stripped organic solvent from wash stage 22 typically have a pH of 10.6, specific gravity of 0.993, and contain 0.64 grams of $WO_3$ per liter.

In accordance with the principles of the present invention, the stripped organic extractant exiting from the stripping circuit is contacted with activated carbon to remove impurities. With reference to the drawings, impurities orginally present in the aqueous feed may be transferred to the loaded organic in the extraction circuit stages 10, 12, and 14. As the organic extractant is recycled, impurities tend to increase in concentration so as to reduce the extraction efficiency. It has been observed that phase separation becomes more difficult due to the tendency to form an emulsion. Also, the product, concentrated aqueous solution of ammonium tungstate, may have an increase in the concentration of soluble impurities such as alkali metals, in particular sodium. With the removal of the impurties by activated carbon, the above problems are overcome.

As illustrated in FIG. 1-B, the cleaning cycle includes washing the stripped organic exiting stage 20 by mixing with wash water in mixer 38 and separating the stripped organic from the wash water in the associated settling tank. Next, the washed stripped organic is fed to the absorbtion column 15 which contains activated carbon for removing impurities which undesirably cause product contamination and reduced efficiency.

Activated carbon typically is an amorphous form of carbon characterized by high absorptivity for gasses, vapors and colloidal solids. The carbon is typically obtained by the destructive distillation of wood, nut shells, animal bones or other carbonaceous material. Activation generally denotes heating the carbon to temperatures in the range of 800° to 900° C. with steam or carbon dioxide to result in a porous internal structure. Typically the internal surface area of activated carbon can be 10,000 sq. feet per gram. Although the exact chemistry which occurs when activated carbon is utilized in the present invention is not known, as compared with prior art processes described In British Pat. No. 1,240,524, improved extraction, improved phase separation during stripping and decreased levels of alkali metal result.

When sodium is the alkali metal, it is preferable to treat the stripped organic extractant with sufficient activated carbon so as to reduce the sodium content to less than about 0.1 grams of sodium per liter of stripped organic extractant as determined after the washing step. It is desirable in accordance with the preferred embodiment of the present invention to employ the washing step prior to the absorption step.

The following example is made with reference to loaded organic which is untreated with activated carbon so as to illustrate beneficial effects of the present invention in achieving low sodium content. About 10 grams of Darco activated carbon is added to 400 ml. of loaded organic which exits from stage 22 as described in the forementioned example prior to placing the absorption column in the precess. The activated carbon and loaded organic were stirred for about 10 minutes and passed through a filter paper to remove the activated carbon. The loaded organic is subjected to two washings and then stripped with a fortified ammonium tungstate solution. The sodium level after the first washing is 0.55 grams per liter and after the second washing is 0.12 grams per liter. The sodium content in the resulting ammonium tungstate solution is 0.06 grams per liter. The above steps were repeated with 400 millimeters of organic from stage 22 without treating with activated carbon as above. In other words, only the washing steps were performed. The sodium concentration after the first washing was 6.8 grams per liter and after the second washing was 0.62 grams per liter. The resulting ammonium tungstate solution had a concentration of sodium of 0.23 grams per liter. The use of activated carbon resulted in a decrease of sodium by about 4 times.

While there have been described various embodiments of the present invention, the methods in particular described the preferred embodiments should not be taken as limiting the scope of the present invention.

We claim:

1. A continuous process for producing ammonium tungstate from an aqueous alkali metal tungstate solution and reduciing the concentration of alkali metal impurities in ammonium tungstate produced comprising the steps of: (a) extracting tungsten values into an organic extractant by contacting said aqueous alkali metal tungstate solution with said organic extractant for a sufficient period of time to form a loaded organic extractant containing tungsten values and an aqueous solution, said organic extractant comprising: a high molecular weight tertiary alkyl amine and an water insoluble aliphatic organic solvent, (b) separating said loaded organic extractant from said aqueous solution, (c) stripping said loaded organic extractant from step b by contacting with an aqueous ammonia solution to form an aqueous ammonium tungstate solution and a stripped organic extractant, (d) separating said aqueous ammonium tungstate from said stripped organic extractant, (e) washing said stripped organic extractant to remove a portion of alkali metal impurities and (f) contacting said stripped organic extractant with activated carbon for removing additional alkali metal impurities, (g) feeding said stripped organic extractant from step (e) to step (a) for use as said organic extractant.

* * * * *